March 12, 1957  F. J. WASHABAUGH  2,784,921
PAY-OFF MECHANISM FOR DEAD REELS
Filed April 2, 1954  3 Sheets-Sheet 1

Inventor:
FRANK J. WASHABAUGH,
by: Donald G. Dalton
his Attorney.

March 12, 1957 F. J. WASHABAUGH 2,784,921
PAY-OFF MECHANISM FOR DEAD REELS
Filed April 2, 1954 3 Sheets-Sheet 3

Inventor:
FRANK J. WASHABAUGH,
by: Donald G. Dalton
his Attorney.

United States Patent Office 2,784,921
Patented Mar. 12, 1957

2,784,921

PAY-OFF MECHANISM FOR DEAD REELS

Frank J. Washabaugh, New Haven, Conn., assignor to United States Steel Corporation, a corporation of New Jersey Application April 2, 1954, Serial No. 420,709

4 Claims. (Cl. 242—128)

This invention relates to an improved wire pay-off mechanism for dead reels.

An object of the invention is to provide an improved pay-off mechanism which allows wire to feed continuously and offers maximum operating flexibility.

A more specific object is to provide an improved mechanism which pays off wire alternately from two dead reels without interruption when the bundle on either is exhausted and which pays off the wire in any direction desired.

Figure 1:
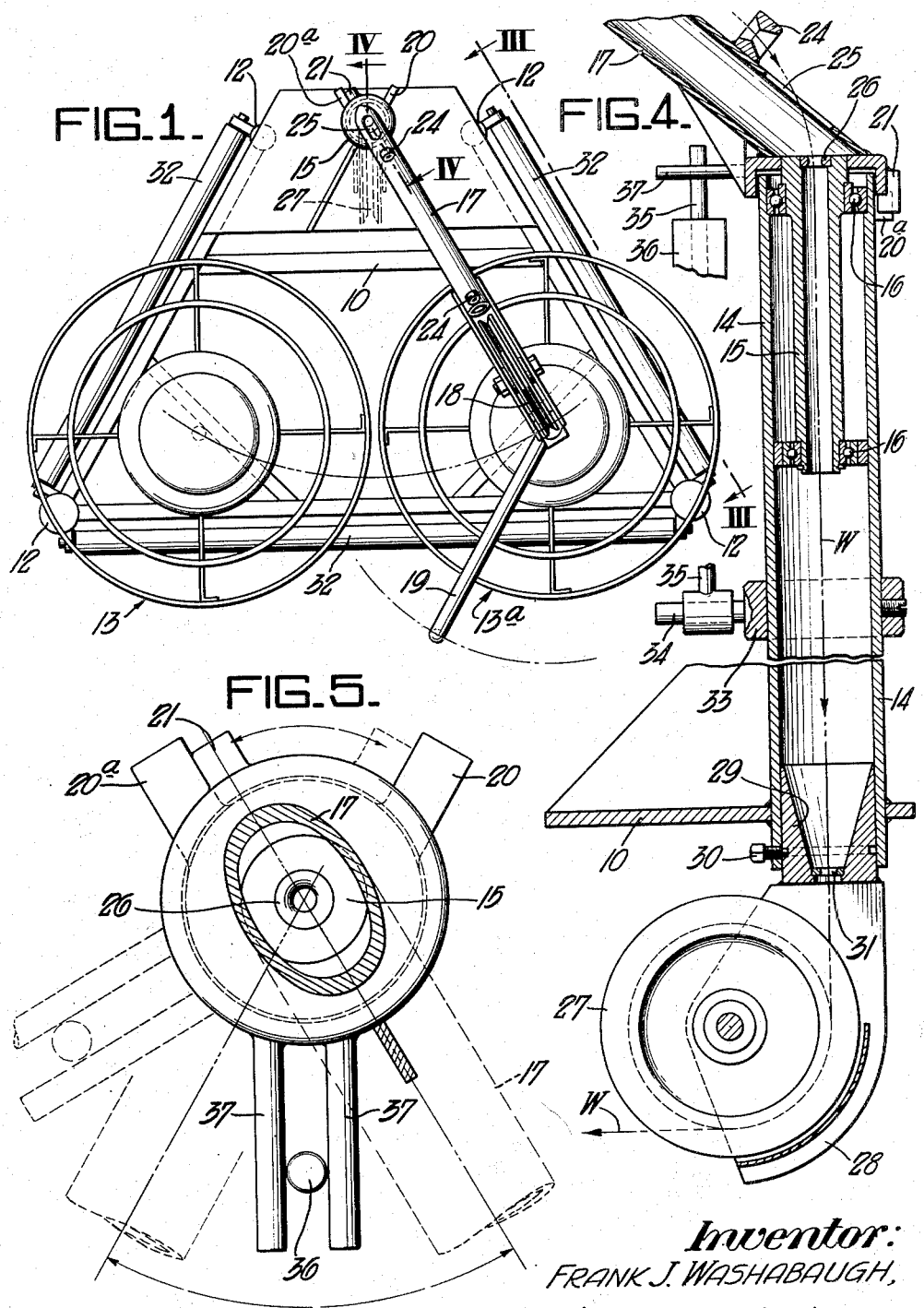
Figure 2:
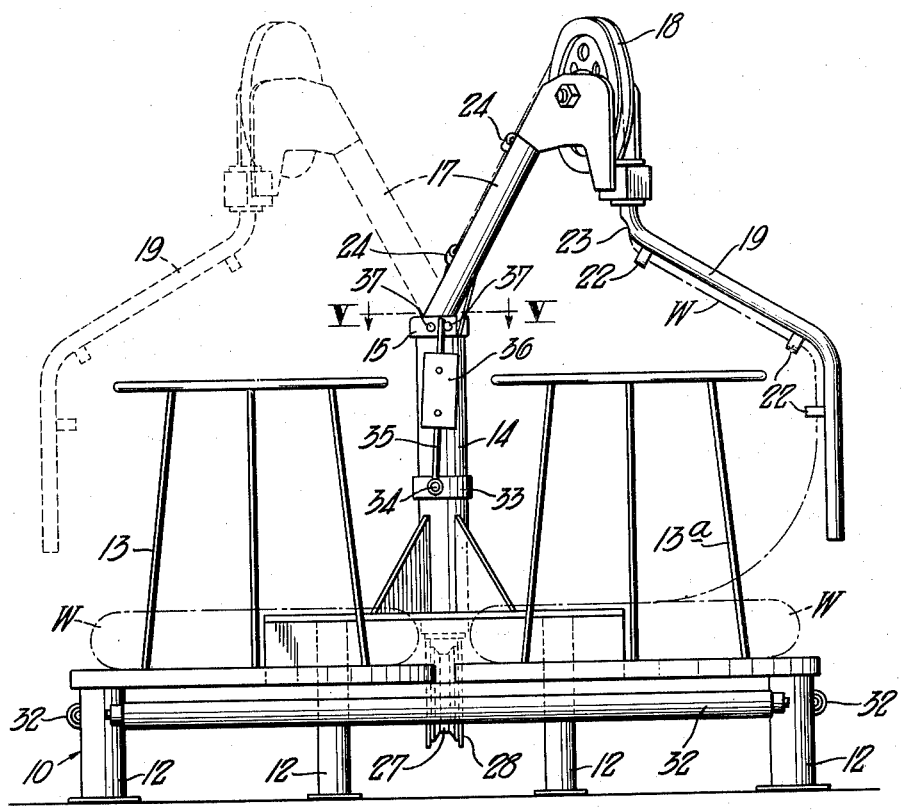
Figure 3:
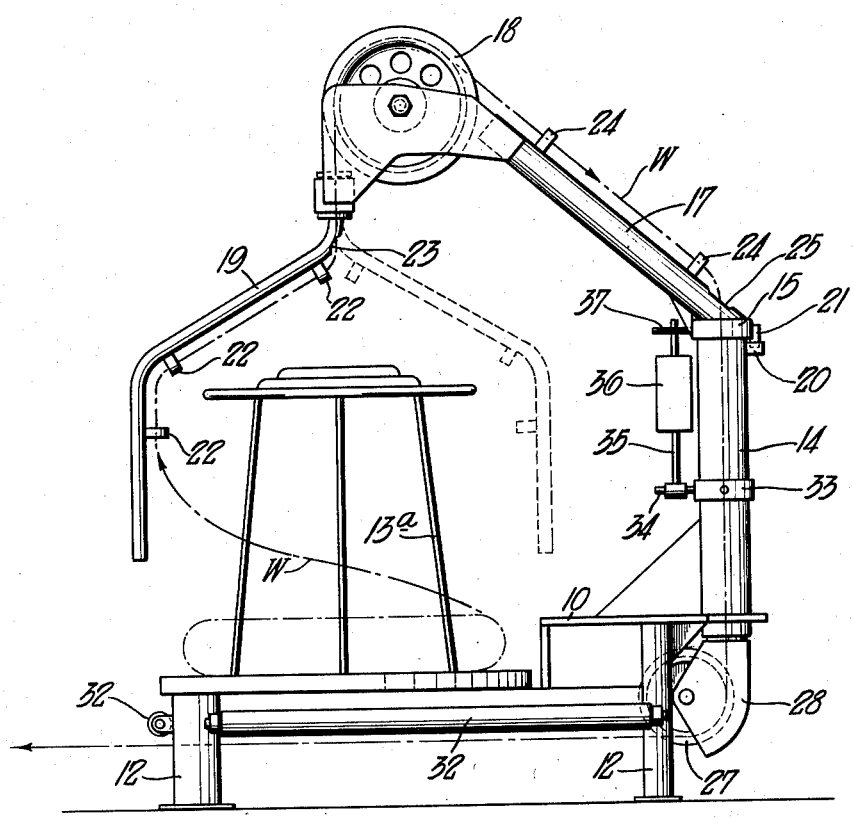

In accomplishing these and other objects of the invention, I have provided improved details of structure, a preferred form of which is shown in the accompanying drawings, in which:

Figure 1 is a top plan view of my pay-off mechanism;
Figure 2 is a front elevational view;
Figure 3 is an elevational view taken on line III—III of Figure 1;
Figure 4 is a vertical section taken on line IV—IV of Figure 1; and
Figure 5 is a horizontal section taken on line V—V of Figure 2.

My pay-off mechanism includes a frame 10 which preferably is trapezoidal in plan and has a plurality of supporting legs 12. The frame carries two laterally spaced dead reels 13 and 13a on its upper face. Each reel is adapted to receive a bundle of wire W for paying off to other equipment, such as an annealing furnace, galvanizing line, or wire drawing machine, not shown.

A tubular vertical stanchion 14 is fixed to the rear portion of the frame 10 with its vertical center line equidistant from the vertical center lines of the two reels 13 and 13a. Preferably the center lines of the two reels are spaced from each other by this same distance so that the three center lines are located at the apices of an equilateral triangle. A tubular vertical shaft 15 is journaled in the stanchion 14 on vertically spaced bearings 16 (Figure 4). An upwardly sloping arm 17 is rigidly affixed to the top of this shaft. A sheave 18 is journaled to the extremity of this arm. A second arm 19 also is journaled to the extremity of the arm 17 and extends outwardly and downwardly therefrom. The stanchion 14 carries a pair of arcuately spaced stops 20 and 20a, and the arm 17 carries a cooperating abutment 21 adjacent its juncture with the shaft 15 (Figure 5). When said abutment engages the stop 20, the arm 17 overlies the reel 13, and the centerline of this reel is tangent to the sheave 18 and coincides with the axis of rotation of the arm 19. When the abutment engages the other stop 20a, the sheave 18 and arm 19 bear a similar relation to the reel 13a (Figure 3). The stops 20 and 20a limit pivotal movement of the arm 17 to a 60° arc, but the arm 19 can rotate unrestricted and can describe a circular path around either of the reels 13 or 13a.

The underside of the arm 19 carries a series of fixed guide loops 22, and it contains an opening 23 directly under the portion which is attached to the arm 17 (Figures 2 and 3). At least this portion of the arm 19 is tubular. The upper face of the arm 17 carries an additional series of guide loops 24 and it contains an opening 25 directly over the bore of the shaft 15. The upper end of the shaft bore contains a guide ring 26 (Figure 4).

A sheave 27 is journaled in a bracket 28 which is attached to the underside of the frame 10 beneath the stanchion 14 (Figure 4). The centerlines of the stanchion 14 and shaft 15 are tangent to this sheave. The bracket includes an annular fitting 29 which is received in the lower end of the bore in the stanchion 14 and normally held fixed by a set screw 30. However, this bracket can be adjusted manually to locate the sheave 27 in any desired plane radially of the shaft 15 to enable wire to be withdrawn therefrom in any direction. The fitting 29 contains a fixed guide ring 31. Elongated horizontal rollers 32 extend between the legs 12 underneath the fixed parts of the frame 10 (Figures 1, 2 and 3).

In operation, the sheave 27 and bracket 28 are adjusted to locate the sheave in a plane radially of the shaft 15 toward which the wire is to be paid off. Bundles of wire W are placed on each of the reels 13 and 13a. The arm 17 is swung to a position over one of the reels. The leading end of the bundle on that reel is threaded through the guide loops 22 and opening 23 in the arm 19, over the sheave 18, through the guide loops 24 and opening 25 in the arm 17, through the guide ring 26, the bore of shaft 15 and guide ring 31, and under the sheave 27. The wire is pulled from the bundle by a take-up block, not shown on the mechanism into which it feeds. As the wire pays off, the arm 19 revolves freely about its pivot on the arm 17. The roller 32 under which the wire pays off prevents its contacting the fixed parts of the frame 10. While the first bundle is paying off, the leading end of the wire in the second bundle is butt welded to the trailing end of the first bundle. When the first bundle is exhausted, the arm 17 automatically swings to its other position when it overlies the other reel. The bundle on this reel then commences to pay off without interruption.

Preferably the mechanism also is equipped with a pendulum type counterbalance which assists in swinging the arm 17 between its two positions and steadies the arm in either position over one of the reels. The counterbalance includes a collar 33 which is fixed to the outside of the stanchion 14 and carries a pivot stud 34. An upwardly extending rod 35 is freely pivoted at its lower end to this stud. A counterweight 36 is adjustably fixed to said rod. The upper end of the shaft 15 carries a pair of closely spaced outwardly extending studs 37, between which the rod fits loosely. The weight 36 tends to hold the shaft 15 and arm 17 in either position to which they are shifted. It also assists in moving these parts into their proper operating positions. I have shown the counterweight arranged somewhat off center so that it applies a greater force against the shaft and arm when the arm overlies the reel 13 than when it overlies the reel 13a. This feature is optional, but is desirable when it is inherently easier to shift the arm one way than the other, as when the bundles are all wound in the same direction.

While I have shown and described only a single embodiment of the invention, it is apparent that modifications may arise. Therefore, I do not wish to be limited to the disclosure set forth but only by the scope of the appended claims.

I claim:

1. A pay-off mechanism comprising a frame having legs adapted to support it in spaced relation above a surface beneath, a pair of spaced apart dead reels mounted on said frame, a tubular vertical stanchion fixed to said frame and extending upwardly therefrom with its vertical center line equidistant from the vertical center lines of the two reels, a tubular vertical shaft journaled in said stanchion, an arm carried by said shaft, a sheave journaled to the extremity of said arm, a second arm journaled to the extremity of said first named arm and extending downwardly and outwardly therefrom, said first named arm being adapted to overlie either of said reels with the center line of the reel being tangent to said sheave and lying on the axis of rotation of said second arm, whereby this arm can describe a circular path around the reel, guide means carried by said arms for directing wire from a bundle on the reel over said sheave and down through the bore of said shaft, and a sheave journaled to said frame under said shaft.

2. A mechanism as defined in claim 1 including arcuately spaced stops and a cooperating abutment carried by said stanchion and said shaft to limit the rotation of said shaft between positions in which said first named arm overlies one or the other of said reels.

3. A mechanism as defined in claim 2 including an upwardly extending rod pivoted to said stanchion, means on said shaft loosely receiving said rod, and a counterweight carried by said rod, said counterweight acting to steady said first named arm in either of its two positions and assist in moving the arm between these positions.

4. A mechanism as defined in claim 1 in which the axis of said shaft is tangent to said second named sheave and the plane of this sheave is adjustable radially with respect to this axis.

References Cited in the file of this patent
UNITED STATES PATENTS

| | | |
|---|---|---|
| 748,149 | Baker | Dec. 29, 1903 |
| 986,020 | Mills | Mar. 7, 1911 |
| 2,673,045 | Lewis | Mar. 23, 1954 |